Patented Jan. 17, 1928.

1,656,233

UNITED STATES PATENT OFFICE.

JAMES P. PENNY, OF BUFFALO, NEW YORK, ASSIGNOR TO NATIONAL ANILINE & CHEMICAL CO., INC., OF NEW YORK, N. Y., A CORPORATION OF NEW YORK.

PRODUCTION OF OIL SOLUBLE AZO COLORING MATTERS.

No Drawing.   Application filed March 2, 1926.   Serial No. 91,813.

This invention relates to the manufacture and production of new azo coloring matters which are of value for coloring hydrocarbons, oils, fats, waxes, varnishes, etc. They are also of value as pigments. The material colored by the new azo coloring matters also constitutes a part of the present invention.

It is well known that the coloring matters produced by coupling a diazotized aromatic amino body, such as aniline or aminoazobenzene, or a homologue thereof, etc., into a phenol or a naphthol are generally more or less soluble in alcohol, hydrocarbons, oils, fats, waxes, etc.; and are employed to a lesser or greater extent for coloring the same. Their usefulness, however, as coloring matters for said substances is largely a function of their solubility in them or of their capability of producing highly dispersed or colloidal solutions or admixtures therewith. As prepared by heretofore known processes, they often contain an undesirable amount of matter insoluble in said substances or they lack the desired degree of solubility in them.

According to the present invention, in the production of azo coloring matters by coupling diazo compounds of the arylamines or of the aminoazo derivatives of the aromatic hydrocarbons, more particularly aniline, its homologues, and alkoxy derivatives (i. e., $OCH_3$, $OC_2H_5$, $OC_4H_9$, $OCH_2C_6H_5$, etc.), which are free from an acid group, e. g., a carboxyl or a sulfo group, with a phenol or a naphthol body, more especially alpha- and beta-naphthol, there is employed an excess of the diazo compound over and above that required for the production of a definite azo compound, and the excess of diazo compound is subsequently decomposed preferably in the presence of the resulting azo body and the composite coloring matter then isolated and dried in any suitable manner.

By incorporating the hydrolytic decomposition products of a diazo compound with the azo body, the coloring matters thus produced are more soluble in alcohol, hydrocarbons, oils, fats, waxes, etc., or are capable of giving superior colloidal or dispersed solutions or admixtures therewith, than the analogous products similarly produced but which are substantially free from the hydrolytic decomposition products of diazo bodies. The decomposition products of other and different diazo compounds, or a mixture of diazo compounds, may also be employed in place of those arising from the particular diazo component or components used in the production of the azo body. That is, when the coupling between any given diazo compound and the phenol or naphthol body is completed in any suitable or well known manner for the production of an azo dyestuff, another and different diazo compound may be added under conditions whereby it is decomposed and prevented, or substantially so, from any coupling action on its part.

In carrying out the process of the present invention, the diazo compound is coupled with the phenol or naphthol component in any well-known or suitable manner. In case the phenol or naphthol body is being coupled with the maximum number of molecular proportions (i. e., moles) of the diazo component with which it is capable of coupling an excess of the diazo component may be present or it may be added at the completion of the combination, and said excess be decomposed, preferably after completion of the combination, in any suitable manner, for example, by means of heat or by standing over a considerable period of time, said decomposition being effected preferably in the presence of water. Where the phenol or naphthol body is being coupled into a definite number of molecular proportions (moles) of the diazo component less than the maximum number with which it is capable of combining, the excess of diazo component is preferably added to the completed coupling at a sufficiently high temperature to rapidly decompose the diazo body and thus prevent or minimize it from coupling with the azo body present. It may be pointed out that the coupling of the diazo component with the phenol or naphthol component is usually carried out in alkaline media and such solutions particularly when strongly caustic in their reaction tend to promote the decomposition of diazo compounds, especially at elevated temperatures or upon standing at ordinary temperatures over a period of time.

The following specific examples will further illustrate the invention, but it will be understood that the invention is not limited thereto. The parts are by weight.

*Example 1.*—A solution of 18 parts (1.94 moles) of aniline in 60 parts of water, 50 parts of 20° Bé hydrochloric acid and sufficient ice (about 80 parts) to bring and maintain the solution at a temperature of about 0° to 2° C. is diazotized in the usual manner by the addition of about 14.5 parts of sodium nitrite (96% purity). The iced solution thus obtained is then added rapidly to a well-stirred solution of 8.5 parts (0.59 moles) of alpha-naphthol dissolved in 220 parts of water and 22.5 parts (5.6 moles) of caustic soda, the temperature being maintained at about 0° to 8° C. by the addition of sufficient ice (about 80 parts). The mixture is stirred for about an hour at 0° to 8° C. in order to complete the formation and precipitation of di(phenylazo)-alpha-naphthol, and then for 16 to 18 hours without additional cooling. The temperature gradually rises to about 15° C. and the mixture foams considerably due to the decomposition of the excess diazobenzene. It is then gradually heated to about 85° C. and the precipitated coloring matter filtered off, washed well with warm (about 35° C.) water and then with cold water, dried at 80°–85° C. and ground.

The coloring matter thus obtained is probably comprised of 2.4-di(phenylazo)-alpha-naphthol, which corresponds with the probable formula:

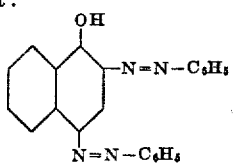

in admixture or combination with the hydrolytic decomposition products of diazobenzene, and in the dry state, is a dark brown powder, insoluble in water or in 10 percent caustic soda solution, sparingly soluble in alcohol giving a light brown solution, soluble in benzene giving a dark brown solution, and soluble in concentrated sulfuric acid with a dark to black solution which on dilution with water gives a brown precipitate. It colors or stains wood, waxes, oils, fatty acids, benzene, etc., brown shades.

In the above example, there is employed an amount of diozobenzene about 65 percent in excess of that required to form di(phenylazo)-alpha-naphthol. The hydrolytic decomposition of this excess diazobenzene (i. e., a decomposition effected in the presence of water), and the incorporation of the decomposition products in combination, solution or admixture with di(phenylazo)-alpha-naphthol produces a product which is considerably more soluble in alcohol or in benzene than pure di(phenylazo)-alpha-naphthol. In an analogous manner, in place of aniline there may be employed other amines, for example, toluidine, xylidine, anisidine, cresidine, aminoazobenzene, aminoazotoluene, aminoazoxylene, naphthylamine, etc. Further, a part of the alpha-naphthol may be substituted by an equivalent amount of beta-naphthol, the use of the latter tending to give yellower shades. Diazo and polyazo oil-soluble coloring matters may also be similarly prepared from the dihydroxy derivatives of the aromatic hydrocarbon, for example, resorcin.

*Example 2.*—15.7 parts (1.15 moles) of cresidine (i. e., 4-methyl-2-amino-1-methoxybenzene) dissolved in 400 parts water and 28 parts of 20° Bé hydrochloric acid are diazotized in the usual manner by means of about 7 parts of sodium nitrite, sufficient ice being added to keep the temperature at about 0° to 5° C. 14.4 parts (1 mole) of beta-naphthol are dissolved in 300 parts of water containing 10 parts of caustic soda, and cooled to about 0° C. by the addition of ice. The diazotized cresidine solution is added to the well stirred beta-naphthol solution, the temperature being maintained at about 0° to 5° C., by the addition of ice or by other suitable means. After stiring the mixture for about an hour in order to complete the formation and precipitation of the monazo dye, the solution is slowly heated to about 70°–80° C., to decompose the excess diazo solution and the coloring matter then filtered off, washed well with water, dried at about 60°–80° C. and ground to a powder.

The dyestuff thus obtained is probably comprised of 1-(2'-methoxy-5'-methylbenzene-1'azo)-beta-naphthol of the probable formula:

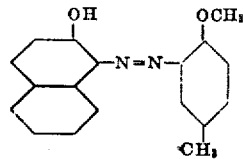

in admixture or combination with decomposition products of diazotized 4-methyl-2-amino-1-methoxybenzene, and is a red powder substantially insoluble in water and in dilute caustic soda solution. It is soluble in alcohol or benzene to give a red solution, and in concentrated sulfuric acid giving a violet solution which on dilution with water produces a red precipitate. It colors oils, fats, waxes, varnishes, rubber, etc., red shades of excellent brilliance.

In the above example, in place of cresidine other alkyl ethers of the amino phenols or their homologues may be employed, such as anisidine, phenetidine, 2-amino-5-methyl-1-methoxy (or ethoxy)-benzene, the benzyl ether of 2-methyl-4-aminophenol or of 4-methyl-2-aminophenol, etc. If in the above example, the product is filtered off before heating the solution to decompose the excess diazo body, 1-(2'-methoxy-5'-methyl-benzene-1'-azo)-beta-naphthol is obtained in a substantially pure condition and is considerably less soluble in benzene than when it contains the decomposition products of diazo compounds. The substantially pure product may be employed in the manufacture of valuable lakes and pigments.

It will be understood that the decomposition products derived from diazo compounds which are or may be present in the coloring matters contemplated by the present invention may vary in amount over a wide range without departing from the spirit and scope of the invention. It will be also understood that the term "hydrolytic decomposition products" as used in the present invention refers to and includes those products obtained by the decomposition of diazo bodies preferably in the presence of azo bodies and alkaline aqueous media. They are of unknown composition, being complex mixtures, and are usually, though not always, tarry and resinous in nature.

In the claims it will be understood that the term "phenol body" denotes and includes, unless otherwise specified, a hydroxy derivative of a benzene hydrocarbon and of naphthalene free from other substituents; that the term "naphthol body" denotes and includes alpha- and beta-naphthol; and that the term "arylamino body" denotes and includes, unless otherwise specified, amino and aminoazo compounds of the benzene and naphthalene series which are free from acid groups but may contain alkoxy groups.

I claim:—

1. In the production of an azo coloring matter soluble in benzene, a process which comprises incorporating the hydrolytic decomposition products of a diazotized arylamino body with an azo body derivable from a diazotized arylamino body and a phenol body.

2. In the production of an azo coloring matter soluble in benzene, a process which comprises incorporating the hydrolytic decomposition products of a diazotized arylamino body with an azo body derivable from a diazotized arylamino body of the benzene series and a naphthol body.

3. In the production of an azo coloring matter, a process which comprises incorporating the hydrolytic decomposition products of a diazotized arylamino body of the benzene series with a commixture of azo bodies derivable from a diazotized arylamino body and alpha- and beta-naphthol.

4. In the production of an azo coloring matter soluble in benzene, a process which comprises incorporating hydrolytic decomposition products of a diazotized arylamino body of the benzene series with an azo body derivable from a diazotized arylamino body of the benzene series which contains an alkoxy group and beta-naphthol.

5. A process of making an azo coloring matter soluble in benzene which comprises treating a phenol body in alkaline medium with a diazotized arylamino body in excess of the amount capable of combining with the phenol body to form an azo body, subsequently decomposing the excess of diazo body in presence of the azo body, and isolating the composite product thereby produced.

6. A process of making an azo coloring matter soluble in benzene which comprises treating an azo body derivable from a diazotized arylamino body and a phenol body with a diazotized arylamino body in the presence of water and alkali at a temperature at which the diazo body is decomposed, and subsequently isolating the composite product thereby produced.

7. As a new product, a composition of matter comprising an azo body, derivable from a diazotized arylamino body and a phenol body, in corporation with hydrolytic decomposition products of a diazotized arylamino body; said product being insoluble in water and soluble in benzene.

8. As a new product, a composition of matter comprising an azo body, derivable from a diazotized arylamino body of the benzene series and a naphthol, in commixture with hydrolytic decomposition products of a diazotized arylamino body of the benzene series; said product being insoluble in water and soluble in benzene.

9. As a new product, a composition of matter comprising azo bodies, drivable from a diazotized arylamino body of the benzene series and alpha- and beta-nahpthol, in corporation with hydrolytic decomposition products of a diazotized arylamino body.

10. As a new product, a composition of matter comprising an azo body, derivable from a diazotized arylamino body of the benzene series which contains an alkoxy group, and a naphthol, in corporation with decomposition products of a diazotized arylamino body; said product being insoluble in water and soluble in benzene.

11. As a new product, a composition of matter comprising a monazo dyestuff which corresponds with the following probable formula:

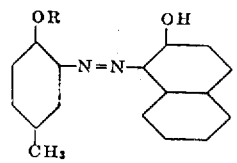

where R represents $CH_3, C_2H_5, C_3H_7, C_4H_9,$ $CH_2 \cdot C_6H_5$, etc., in commixture with the hydrolytic decomposition products of a diazotized arylamino body.

12. As a new product, a composition of matter comprising an azo dyestuff which corresponds with the following probable formula:

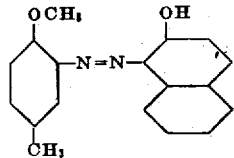

in corporation with the hydrolytic decomposition products of diazotized 4-methyl-2-amino-1-methoxy benzene.

13. Material colored with the product of claim 7.

14. Material colored with the product of claim 8.

15. Material colored with the product of claim 9.

16. Material colored with the product of claim 10.

17. Material colored with the product of claim 11.

18. Material colored with the product of claim 12.

19. In the production of an oil soluble azo coloring matter, a process which comprises reacting a phenyl body with a diazotized arylamino body to form an azo body, and subsequently decomposing a diazotized arylamino body in presence of water and of said azo body.

In testimony whereof I affix my signature.

JAMES P. PENNY.

matter comprising an azo dyestuff which corresponds with the following probable formula:

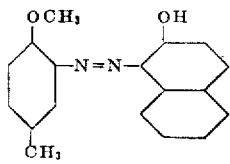

in corporation with the hydrolytic decomposition products of diazotized 4-methyl-2-amino-1-methoxy benzene.

13. Material colored with the product of claim 7.

14. Material colored with the product of claim 8.

15. Material colored with the product of claim 9.

16. Material colored with the product of claim 10.

17. Material colored with the product of claim 11.

18. Material colored with the product of claim 12.

19. In the production of an oil soluble azo coloring matter, a process which comprises reacting a phenyl body with a diazotized arylamino body to form an azo body, and subsequently decomposing a diazotized arylamino body in presence of water and of said azo body.

In testimony whereof I affix my signature.

JAMES P. PENNY.

CERTIFICATE OF CORRECTION.

Patent No. 1,656,233.   Granted January 17, 1928, to

JAMES P. PENNY.

It is hereby certified that error appears in the printed specification of the above numbered patent requiring correction as follows: Page 3, line 103, claim 9, for the misspelled word "drivable" read "derivable"; page 4, line 28, claim 19, for the word "phenyl" read "phenol"; and that the said Letters Patent should be read with these corrections therein that the same may conform to the record of the case in the Patent Office.

Signed and sealed this 20th day of March, A. D. 1928.

Seal.

M. J. Moore,
Acting Commissioner of Patents.

CERTIFICATE OF CORRECTION.

Patent No. 1,656,233.  Granted January 17, 1928, to

JAMES P. PENNY.

It is hereby certified that error appears in the printed specification of the above numbered patent requiring correction as follows: Page 3, line 103, claim 9, for the misspelled word "drivable" read "derivable"; page 4, line 28, claim 19, for the word "phenyl" read "phenol"; and that the said Letters Patent should be read with these corrections therein that the same may conform to the record of the case in the Patent Office.

Signed and sealed this 20th day of March, A. D. 1928.

Seal.

M. J. Moore,
Acting Commissioner of Patents.